(12) United States Patent
Hughes

(10) Patent No.: US 6,636,509 B1
(45) Date of Patent: Oct. 21, 2003

(54) HARDWARE TOS REMAPPING BASED ON SOURCE AUTONOMOUS SYSTEM IDENTIFIER

(75) Inventor: John H. Hughes, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/310,040

(22) Filed: May 11, 1999

(51) Int. Cl.[7] .......................... H04L 12/28; H04L 12/56
(52) U.S. Cl. .................... 370/389; 370/392; 370/351
(58) Field of Search .................. 370/412, 389, 370/390, 392, 411, 428, 429, 395.3, 395.31, 396, 397, 401–402, 395.52, 395.21, 395.6, 474, 351–356

(56) References Cited

U.S. PATENT DOCUMENTS 5,805,808 A * 9/1998 Hasani et al. ............... 709/243
6,157,955 A * 12/2000 Narad et al. ................ 709/228
6,259,699 B1 * 7/2001 Opalka et al. .............. 370/398

* cited by examiner

Primary Examiner—Ajit Patel
Assistant Examiner—Raj Jain
(74) Attorney, Agent, or Firm—Campbell Stephenson Ascolese, LLP

(57) ABSTRACT

A rapid method and apparatus for remapping the type of service (TOS) and source address information from an incoming communications packet according to the desired Quality of Service (QoS) required for the communications flow into a switch or router are described. The input source address field of the packet header is used to access a lookup table of corresponding source autonomous system (AS) labels. The appropriate AS label is combined with the input TOS yielding an intra-switch TOS optimized for the QoS appropriate to the received flow. Alternatively, the netID, a subset of the source address, may be used directly without resort to a lookup table. As a further alternative, the destination address may be used in conjunction with the above. The resulting intra-switch TOS expedites packet management and throughput in the switch/router, facilitating the efficient delivery of the required Quality of Service for that flow.

36 Claims, 7 Drawing Sheets

HARDWARE TOS REMAPPING BASED ON SOURCE AUTONOMOUS SYSTEM IDENTIFIER

BACKGROUND OF THE INVENTION

1. Field of the Invention

The present invention relates to internetworking systems and in particular to methods and apparatus for managing traffic flow and quality of service in routers and switches.

2. Description of the Related Art

Internetworking encompasses all facets of communications between and among computer networks. Such communications data flow streams may include voice, video, still images, and data traffic. All have widely varying needs in terms of propagation delay (or latency) during transit through the network. Various systems and devices, both in hardware and in software, have attempted to deal with the plethora of data flow requirements present in modern internetworking systems.

A particular problem in internetworking traffic regulation arises from the variety of traffic sources or flows presented to the router/switching device. Referring to FIG. 1, illustrating a high-level schematic view of the operation of a prior art router/switch 100, a number of input flows 110 are presented to the unit. These flows each consist of multiple packets of data in a variety of sizes and presented at a variety of rates. Flows may also be presented in different protocols, such as the Transmission Control Protocol/Internet Protocol (TCP/IP) and the related User Datagram Protocol (UDP), File Transfer Protocol (FTP), Terminal Emulation Protocol (Telnet), and Hypertext Transfer Protocol (HTTP). Other protocols are found in the literature, such as Merilee Ford, et. al., *Internetworking Technologies Handbook* (Cisco Press 1997) (hereinafter Ford), incorporated herein by reference in its entirety. The packets are buffered in a buffer pool 120, which is typically random access memory (RAM). Buffering is accomplished according to the directives of a controller 130 and a buffer manager 140. The flows are sent to the proper output port 150 by way of a set of output queues 160 and a port scheduler 170. Controller 130, buffer manager 140, and port scheduler 170 are conventionally implemented as one or more high speed microprocessors with associated interface circuitry.

Quality of Service (QoS) is an attribute of the flow in a given data interchange, i.e., a specification placed on the internetworking devices participating in a communications session controlling the timeliness or latency of the communications. Several methods are known in the prior art for configuring QoS in a network, such as the Resource Reservation Protocol (RSVP) described in Chapter 41 of Ford.

One such scheme for ensuring QoS, known as Committed Access Rate (CAR) service, consists of attempting to regulate the traffic within the router or switch connecting multiple networks in the typical internetworking system. Such schemes attempt to provide fair allocation of data throughput capacity (bandwidth) by allocating router buffer and/or queue space according to the type of packets in each flow stream received. A user is, in essence, sold a certain bandwidth, "B." Flows from that user are not allowed to exceed bandwidth B except when the flows have been consistently less than B for some period of time. Then, and only then, will the switch allow burst traffic (i.e., traffic with bandwidth greater than B) to pass.

Of course, QoS is only useful if there are multiple queues (input and/or output) wherein packets in one queue are given preferential treatment over packets in another queue. In such systems, a method of optimizing queue assignments that allows this differentiated service to be guaranteed (and thus sold to users) is needed.

FIG. 2 illustrates the standard bit configuration for an Internet Protocol packet, including the fields within its header. Flow type, also known as flow classification, information can be found in, for instance, the type of service (TOS) field 210 in the internet protocol (IP) header 200 or in the source address 220 of the received packet. It can also be deduced from the type of packet received, voice being of a higher priority and thus demanding of a larger buffer count than other flows. While dynamic buffer limiting (DBL) is known, current schemes are unable to update their limit values fast enough to keep up with the latest generation of ultra-fast (e.g., Gigabit speed) flows.

As an additional drawback, the use of TOS field 210 is not standardized among internetworking users. Many competing standards, in fact, exist to define how the TOS octet is interpreted.

Examples of competing definitions are found in P. Almquist, *Type of Service in the Internet Protocol Suite*, Internet Request for Comments (RFC) 1349 (July 1992); D. Eastlake III, *Physical Link Security Type of Service*, RFC 1455 (May 1993); and K. Nichols, et al., *Definition of the Differentiated Services Field (DS Field) in the IPv4 and IPv6 Headers*, RFC 2474 (December 1998), all incorporated herein by reference in their entireties. Thus, neither TOS nor source address is a reliable means of identifying flow type at this time.

Source address 220 is a 32-bit value that describes the source of the IP packet. Since the Internet Protocol is connection-less, i.e., data is transmitted onto the network without first establishing an explicit "connection" between sender and receiver, each packet must contain both the full address of the sender and of the recipient. The content and use of the information contained within IP packet header 200 is described in further detail in K. S. Siyan, *Inside TCP/IP* (New Riders Publishing, 3d ed. 1997) (hereinafter Siyan), incorporated herein by reference in its entirety.

The source address consists of two fields, a network ID and a host ID. The network ID is n bits long (minimum of 8 bits, originally in 8 bit increments, e.g., 8, 16, or 24 bits) and identifies the sending network or "autonomous system" (AS). The autonomous system (AS) is an independently managed network of host computers within an interconnected network of networks. The host ID is (32−n) bits and identifies the particular host computer within the sending AS.

The source address clearly provides an indication of the sender, but, by itself, it does not reveal the priority or required timeliness (i.e., the QoS specified by the sender) for the flow. Indeed, in the modern network, certain flows are actually aggregations of many lower rate flows, each potentially having its own QoS requirement. For example, the Internet backbone carries flows consisting of consolidated traffic from one Internet Service Provider (ISP) to another ISP. Within this aggregated flow are individual packets from multiple discrete flows such as a Voice-over-Internet Protocol (VoIP) call between two users, an HTTP request, and an FTP download. Each packet has its own latency limitation requirement, yet all are within the same ISP-to-ISP aggregated flow. Simply classifying the aggregated flow based on its source address (or AS label) is not sufficient to efficiently allocate switch resources and provide the desired packet level QoS.

A further drawback in the prior art lies in the fact that while all packets within an autonomous system (by definition) use the same TOS field definition, those definitions frequently do not cross AS boundaries. In other words, at the AS-to-AS connection, TOS field meanings are lost.

Thus, in the era of high volume aggregated flows containing packets with numerous divergent QoS requirements, prior art per-flow classification systems are unable to provide the necessary packet-tailored QoS to satisfy users. Such systems are known as "policy" routing schemes for their method of directing resources to flows based on external system administrator decisions on the appropriate flow QoS. Policy routing can define a limited number of custom routing paths for selected packets based on certain criteria (such as source address or physical flow input port). For instance, particular traffic flows, such as VoIP, may be sent over special routes that minimize hop counts and other delay characteristics well-known in the art to ensure high QoS. An example of an element of policy routing is Committed Access Rate (CAR) service, discussed above, wherein three bits in the TOS field 210 are used to identify the packet based on a classification according to certain limited criteria. However, the rules for these policy routing decisions are set a priori (for the most part) by the system administrator and are not flexible and adaptable enough to accommodate the extremely high bandwidth of backbone-level, carrier class (ISP-to-ISP) traffic. Also, mechanisms such as CAR are perceived to be too slow to handle ultra-high bandwidth flows.

What is needed is a method to rapidly and adaptably remap packet header data so that the queuing and forwarding portion of the switch/router can efficiently deliver the packet-wise desired quality of service to ultra-high bandwidth, carrier-class flows.

SUMMARY

The present disclosure provides a method and apparatus for rapidly remapping the type of service (TOS) and source address information from an incoming packet according to the desired Quality of Service (QoS) required for that flow. Both the input TOS bits and the source address data are used to compute an intra-switch TOS value (the "internal identifier") that helps expedite packet management and throughput. The input source address field of the packet header is used to access a lookup table of corresponding source autonomous system (AS) labels. The appropriate AS label is combined with the input TOS yielding an intra-switch TOS internal identifier optimized for the QoS appropriate to the received flow.

In an alternate embodiment, the AS label is refined into a peer group number that indexes one of a predetermined set of TOS/AS label transforms to map the incoming packet TOS directly onto the appropriate intra-switch TOS internal identifier.

BRIEF DESCRIPTION OF THE DRAWINGS

The present disclosure may be better understood, and its numerous objects, features, and advantages made apparent to those skilled in the art by referencing the accompanying drawings.

FIG. 1 is also used to illustrate the invention, where prior art circuitry within the blocks is replaced with circuitry in accordance with the invention.

The use of the same reference symbols in different drawings indicates similar or identical items.

DETAILED DESCRIPTION

Overview

Figure 2:
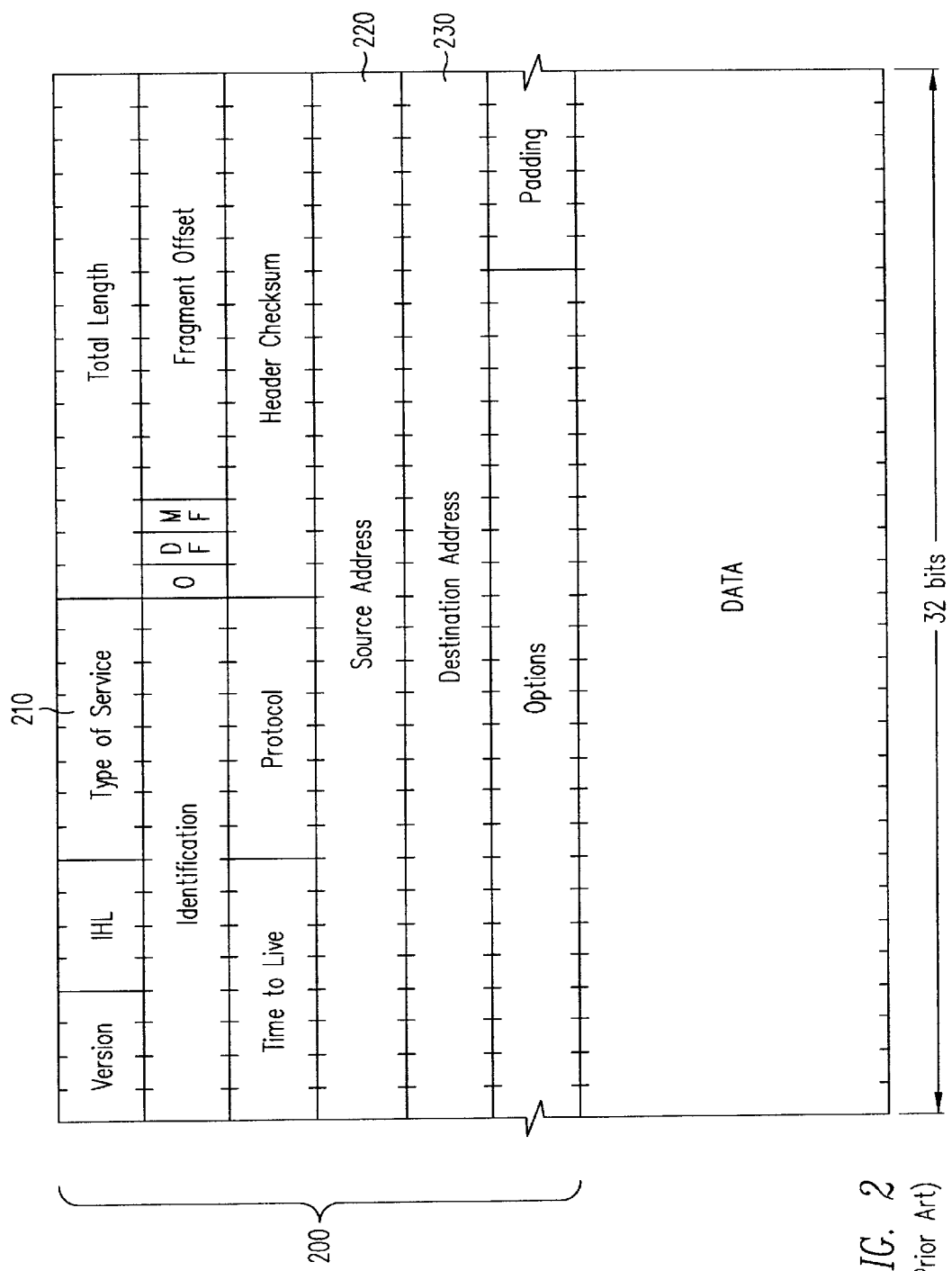
FIG. 2 is a bitmap of a prior art Internet Protocol (IP) packet showing the fields within its header.
Figure 3:
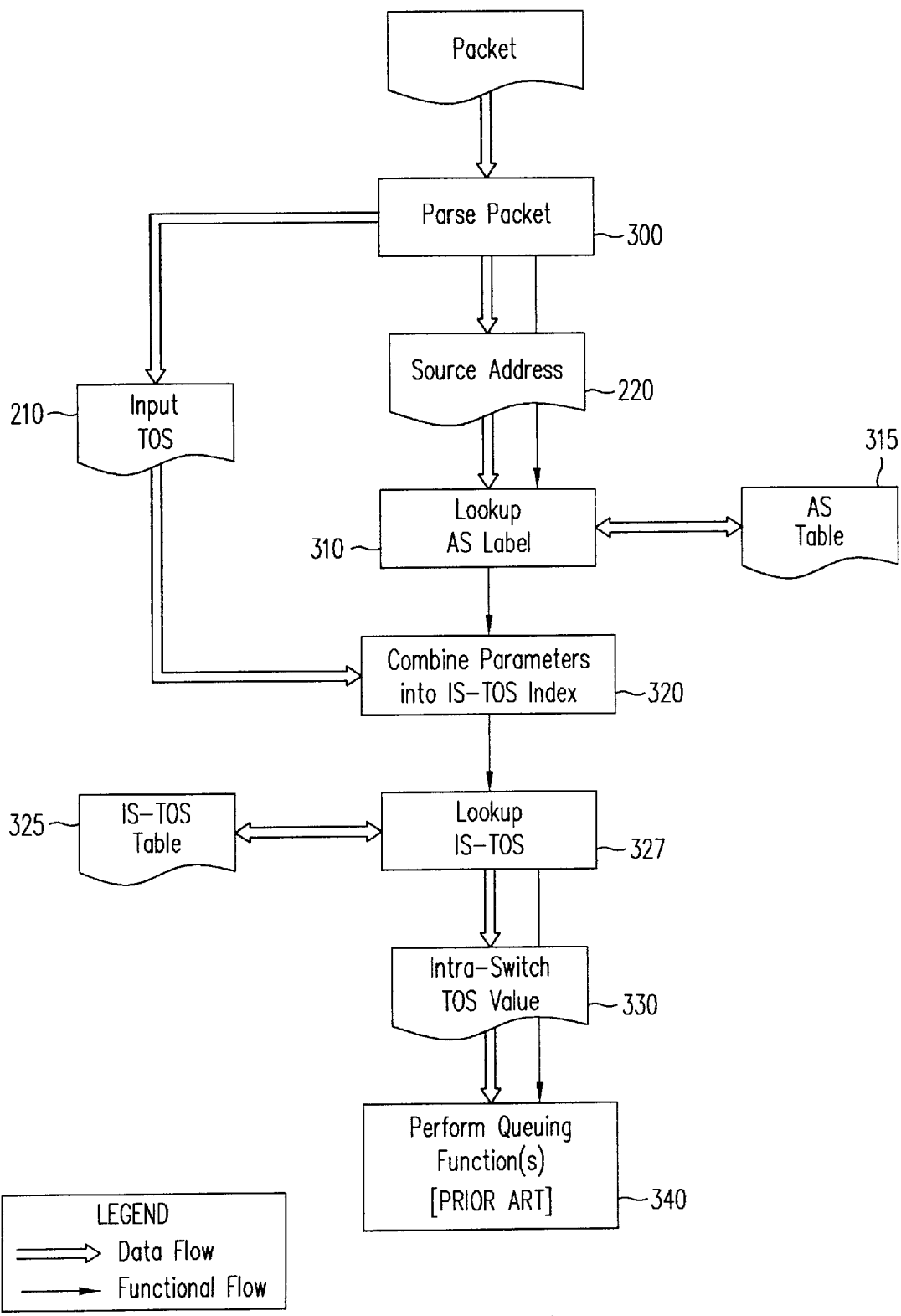
FIG. 3 is a high-level flow chart representation of TOS remapping, according to one embodiment of the present invention.

FIG. 3 is a flow chart of one embodiment of the present invention. Incoming packet header 200 (FIG. 2) is parsed 300 to extract type of service field 210 and source address 220. Source address 220 consists of 32 bits, representing the network ID (netID) and host ID of the sender. As discussed above, the netID (also referred to as the autonomous system [AS] number) can be readily extracted from the source address by means well known in the art. See, e.g., Sivan; John Postel, *Internet Protocol*, Request for Comments (RFC) 791 (September 1981) (defining internet addressing protocols and conventions) and W. Richard Stevens, *TCP/IP Illustrated*, Vol. 1 (Addison Wesley 1994), both incorporated herein by reference in their entireties.

The extracted netID (AS number) then indexes 310 a table 315 containing predetermined autonomous system labels corresponding to each unique netID. This list is defined by the system administrator and stored in the switch memory. It can be updated by the system administrator at any time. As there are a smaller number of AS labels than unique netIDs, fewer bits are required to hold the AS label. Typically, the AS label set defines the "nearest neighbor" autonomous systems connected to a particular switch/router.

In one embodiment, the high order 16 bits of the source address are used as the AS number and mapped (by lookup table 315) to a label of less than 16 bits. In one embodiment, the 16 bit AS number is mapped to an 8 bit AS label. One of ordinary skill in the art will recognize that a variety of mappings of the source address 220 or portions thereof to a smaller number of bits representing a unique autonomous system are possible. Accordingly, the present invention is not limited to any one mapping or to AS labels of any particular length.

In an alternate embodiment, the netID is used directly in subsequent processing, i.e., the AS label equals the entire AS (netID) number. While this embodiment requires more bits to hold the longer netID, it uses fewer switch memory resources since it eliminates the need for AS label lookup table 315. Additionally, this alternate embodiment requires less processing time.

In yet a further alternate embodiment, the AS label mapping table 315 is updated automatically as the local routing tables are updated by methods well-known in the art. As the routing tables are updated, AS label table 315 is updated to reflect "new" nearby autonomous systems (i.e., those newly identified in the routing table). In this way, the correspondence between source AS and the AS label used to create an intra-switch TOS is dynamically updated.

Next (in any of the foregoing alternate embodiments), the AS label or, in the alternate, the netID, is combined 320 with TOS 210 to form an index to intra-switch TOS (IS-TOS) lookup table 325. Intra-switch TOS lookup table 325 contains a limited set of internal TOS (also referred to as "internal identifiers") values, represented by substantially fewer bits than the strict concatenation of input TOS 210 and the AS label (or netID). In other words, intra-switch TOS lookup table 325 maps multiple input TOS/AS label combinations to a single intra-switch TOS value.

Combination 320 is a function of parameters input TOS 210 and the derived AS label (or, alternatively, the netID). The combination is, in one embodiment, a simple concatenation of the fields, such as:

| Source AS Label | TOS |
|---|---|

Alternatively, the TOS may come first, occupying the high order bits. The ordering of the AS label and TOS fields is not important. The fact that both the TOS information and the derived AS label (or netID) are combined in the IS-TOS lookup index is what is significant in this embodiment. Accordingly, the invention is not limited to any one string of fields in the intra-switch TOS lookup index.

The resulting intra-switch TOS value 330 (also referred to as the "internal identifier") is then used to determine packet queuing 340. Queuing may be accomplished according to any of several schemes known in the art, such as Committed Access Rate (CAR) or weighted fair queuing (WFQ). The intra-switch TOS serves as a standardized priority (or precedence) identifier for the queuing decisions. It is not passed out of the switch when the packet is transmitted; rather, it is used internally by the switch to make queuing decisions and does not supersede or overwrite input TOS 210 in packet header 200.

Although a switch and/or router is described, those skilled in the will art realize that communications systems other than routers and switches can be used. Accordingly, the invention is not limited to any particular type of communications or internetworking device. Likewise, while numerous examples are given in the context of Internet Protocol devices and methods, persons of ordinary skill in the art will also recognize that the present disclosure is equally applicable to communications protocols other than the Internet Protocol. Accordingly, the present invention is not limited to any particular protocol.

Figure 1:
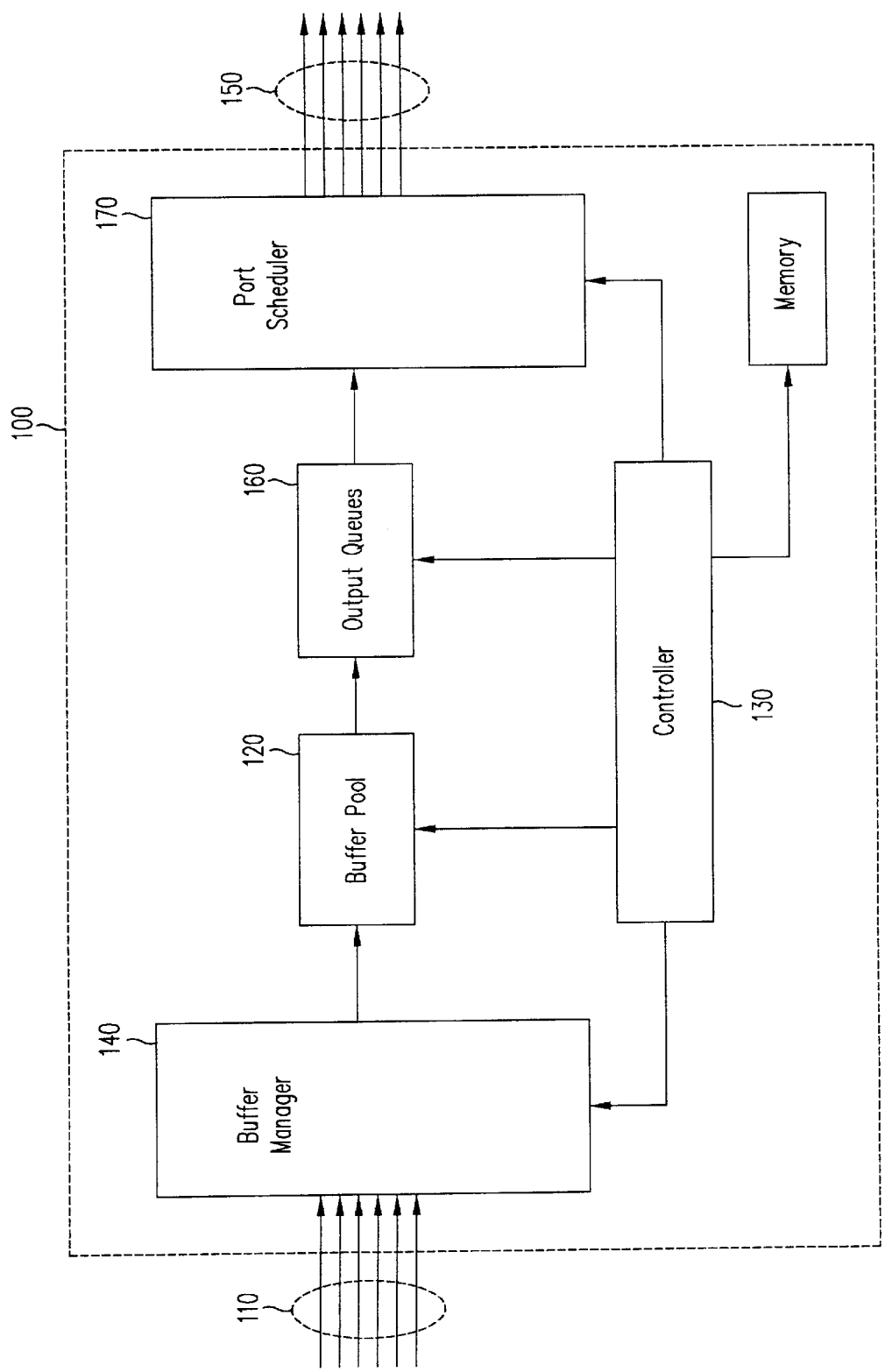
FIG. 1 is a high-level schematic representation of the data flow and control in a prior art switch/router.
Figure 6:
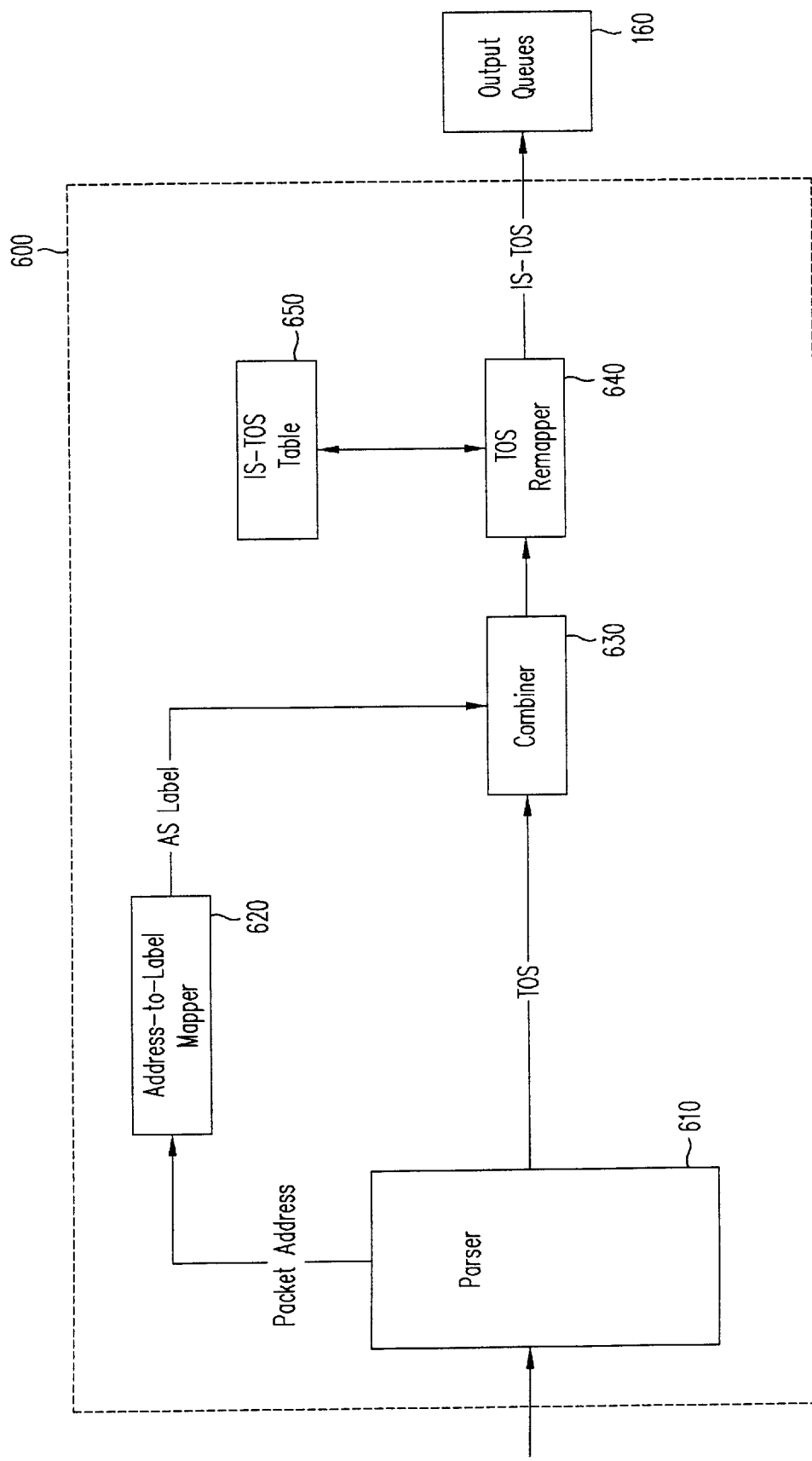
FIG. 6 is a top-level schematic of one embodiment of the present invention.

FIG. 6 shows a simplified schematic block diagram of one embodiment of the present invention. Remapper 600 comprises parser 610, address-to-label mapper 620, combiner 630, TOS remapper 640, and IS-TOS table 650 connected as shown in FIG. 6. In one embodiment, remapper 600 forms part of controller 130, shown in FIG. 1. Remapper 600 (and controller 130) may be implemented in either conventional hardware circuitry or in computer instructions (e.g., software or firmware) executed by a computer system.

Computer instructions implementing the method of the present invention may be embodied in any computer readable media including but not limited to magnetic disks, magnetic tape, optical storage such as CD-ROM, and a carrier wave containing digital signals representing the computer instructions.

Incoming packets are parsed by parser 610 to extract the packet source address and TOS fields. The source address is mapped to an autonomous system (AS) label in address-to-label mapper 620. As discussed above, many mappings are possible, including a direct mapping, i.e., AS label =source address.

The AS label and the TOS field are combined in combiner 630 to form an index. TOS remapper 540 uses this index to read the intra-switch TOS (IS-TOS) value from IS-TOS table 650. The IS-TOS value is then used to control packet queuing in output queues 160 by means well-known in the art.

Destination AS Processing Alternate Embodiment

Figure 4:
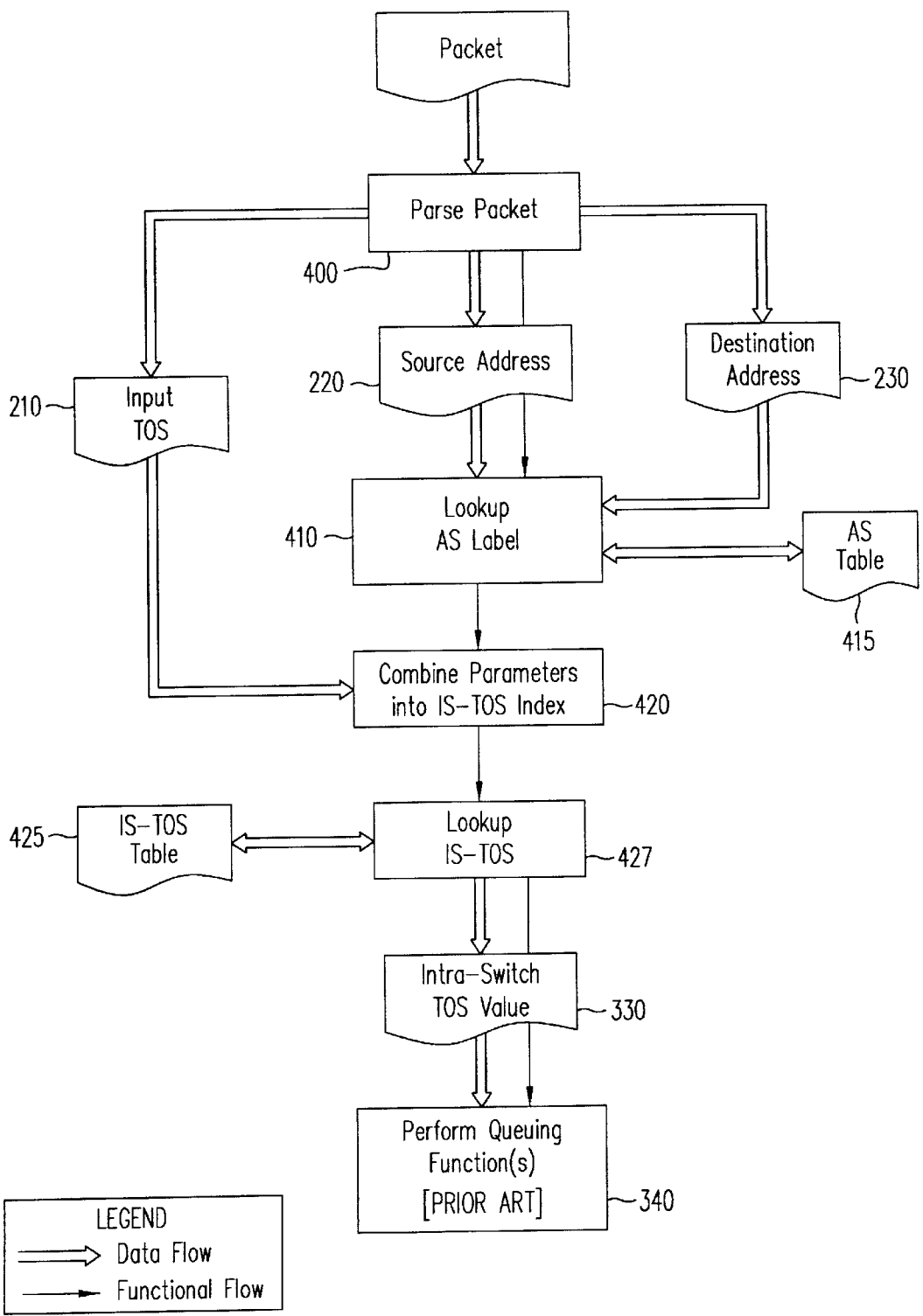
FIG. 4 is a high-level flow chart representation of a destination AS processing alternate embodiment of the present invention.

The intra-switch TOS may also be determined by using a combination of three input parameters: input TOS 210, source AS label (or source netID), and destination AS label (or, alternatively, destination netID). FIG. 4 is the flowchart corresponding to this alternative embodiment. Destination address 230 (referring to FIG. 2) is extracted by parse step 400, in addition to input TOS 210 and source address 220. Processing proceeds analogously to FIG. 3, though here both the source and destination AS labels (or netIDs) are used to independently index 410 AS label lookup table 415. Since the number of autonomous systems typically encountered in backbone-level high bandwidth internetworking is relatively small, and because such autonomous systems both send and receive, a single lookup table 415 will suffice.

As a further alternative, the process may also be accomplished using the destination netID itself, avoiding the use of AS label lookup table 415 at the cost of additional bits in the computations. As in the discussion of source AS to AS label mapping above, various other mappings are also possible and accordingly the present invention is not limited to any particular mapping.

Next (in any of the foregoing alternate embodiments), both the source and destination AS labels or, in the alternate, the netIDs, are combined 420 along with TOS 210 to form an index to intra-switch TOS lookup table 425. Intra-switch TOS lookup table 425 contains a limited set of internal TOS values, represented by substantially fewer bits than the strict concatenation of input TOS 210 and the source and destination AS labels (or netIDs). In other words, intra-switch TOS lookup table 425 maps multiple input TOS/AS label combinations to a single intra-switch TOS value.

The resulting intra-switch TOS value (internal identifier) is then used to determine packet queuing. As above, queuing may be accomplished according to any of several schemes known in the art.

Combination 420 proceeds as combination 320 above, though with a third parameter, the destination AS label (or netID). Combination 420 is, in one embodiment, a simple concatenation:

| Source AS Label | Destination AS Label | TOS |
|---|---|---|

As discussed above, other orderings of the resulting intra-switch TOS 330 are possible as well. Accordingly, the invention is not limited to any one sequence of fields in intra-switch TOS 330.

Referring to FIG. 6, in this alternate embodiment both the packet source address (SA) and the packet destination address (DA) fields are parsed out of the incoming packet in parser 610. Address-to-label mapper maps both the SA and DA to a source AS label and a destination AS label, respectively. Both of these AS labels are then combined with the TOS field in combiner 630 and processing proceeds as described above.

Peer Grouping Alternate Embodiment

Figure 5:
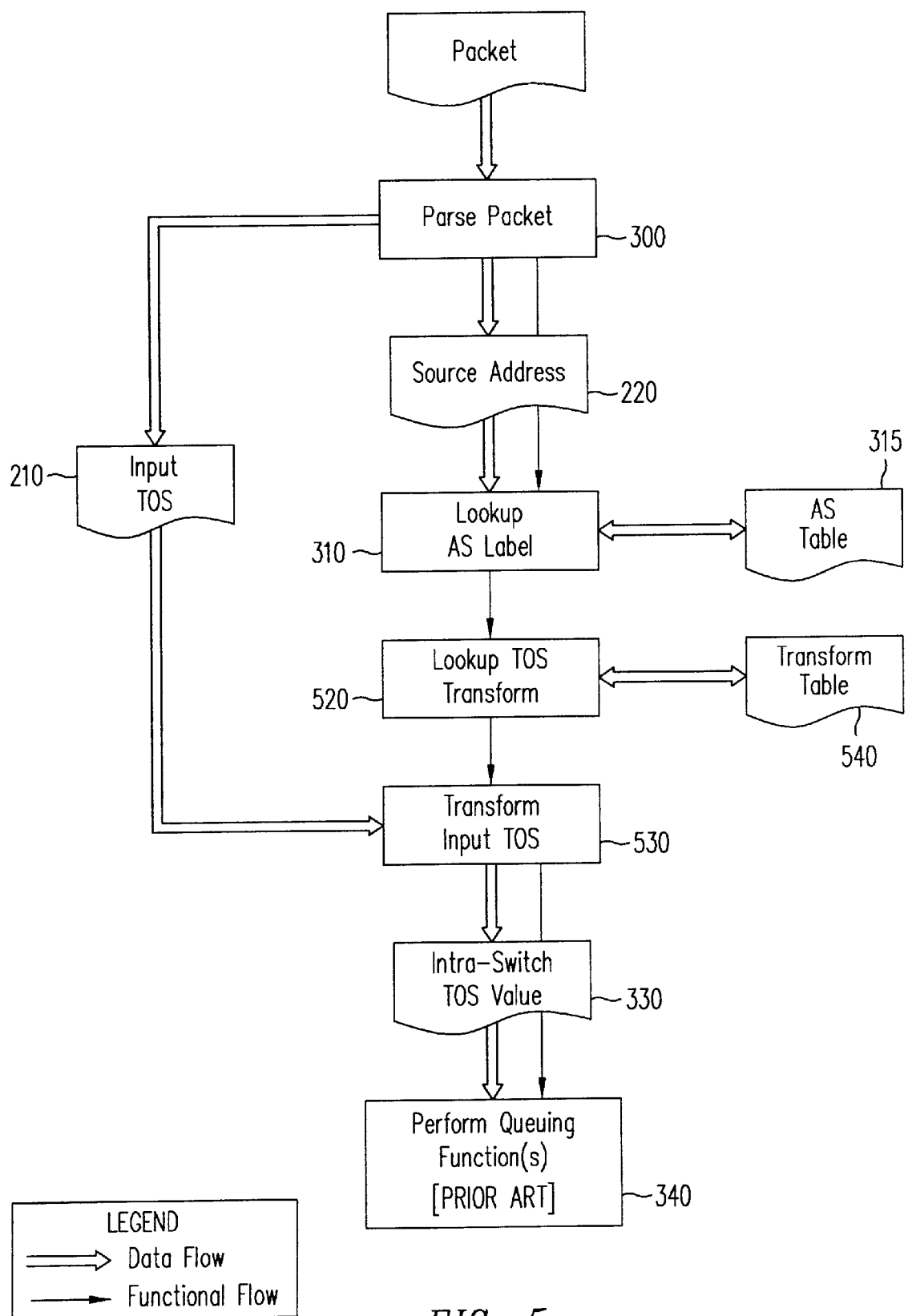
FIG. 5 is a high-level flow chart representation of a peer grouping alternate embodiment of the present invention.

As a further alternative, the AS label (derived from any of the above-described mappings) may be used to define a peer group number, shown in FIG. 5. The peer group number, consisting of the AS label only, is used to select from a predefined list of mappings that convert input TOS 210 directly into an intra-switch TOS. This alternative is possible when the source address is known to the switch as one that consistently uses input TOS field 210 in a predictable manner, i.e., a sender who applies a known, standard meaning to the packet TOS bits. Because the switch is programmed with the TOS bit definitions used by these peer groups, as identified by specific AS labels, a direct TOS mapping is possible.

This alternative is potentially the most efficient, as it requires the least overhead and resources to remap the TOS received in an incoming packet.

Figure 7:
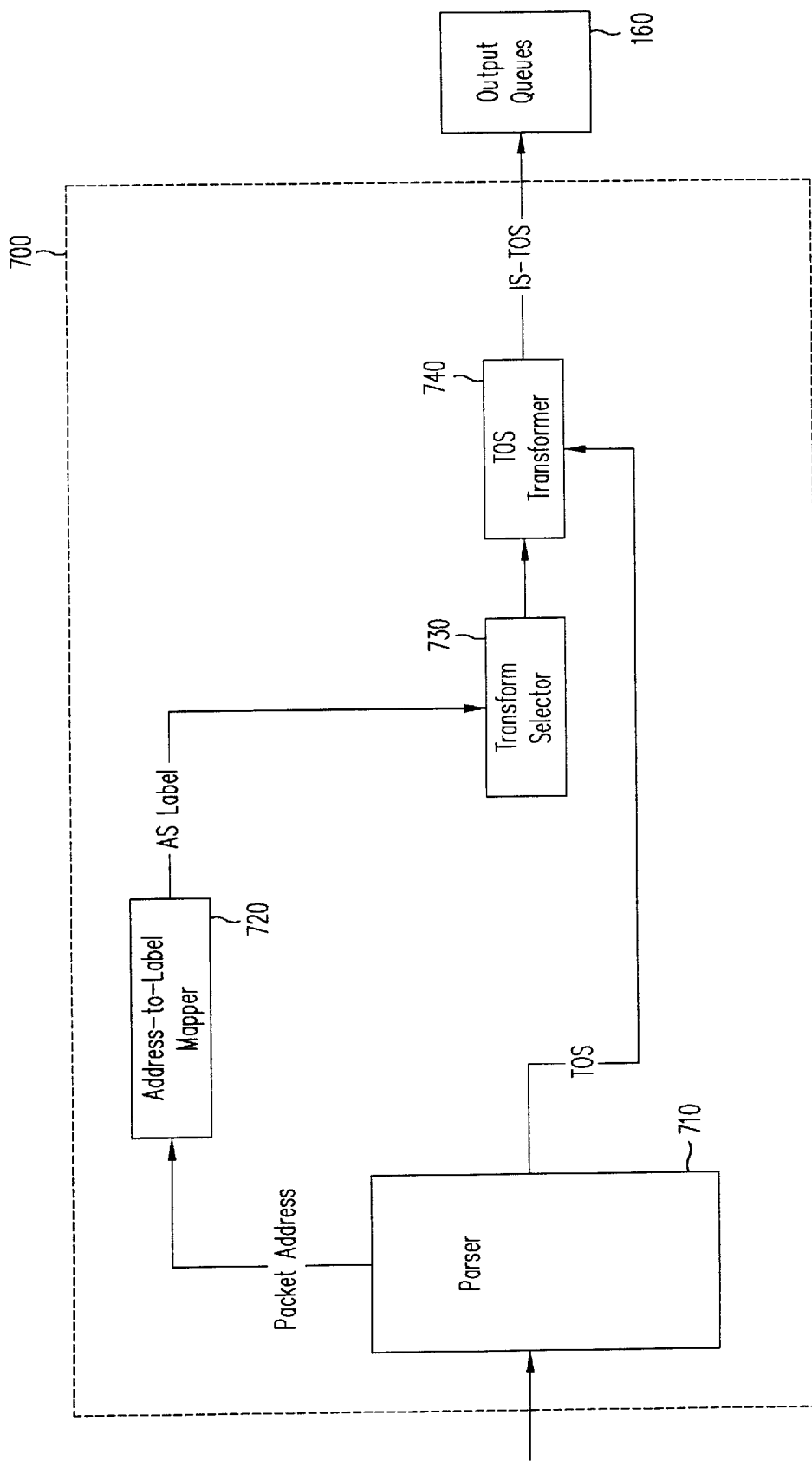
FIG. 7 is a top-level schematic of an alternate embodiment of the present invention.

FIG. 7 shows a simplified schematic block diagram of this alternate embodiment. Parser 710 extracts the TOS and packet address fields as above. The AS label is determined in address-to-label mapper 720 by any of the above-defined mappings. Transform selector 720 selects the corresponding TOS transform function by using the resulting AS label to index a list of possible functions. Transformer 740 applies the selected function to the extracted TOS field to determine the IS-TOS value. As above, the IS-TOS value is then used to control packet queuing by means well-known in the art.

Software Alternate Embodiments

While the above-disclosed method may be embodied in a computer system apparatus (i.e., hardware), one of ordinary skill in the art will appreciate that other embodiments in the form of computer readable instructions for carrying out the disclosed method are equally possible. Such computer readable instruction forms are generally known in the art as such as software or firmware. Accordingly, the present invention is not limited to a particular hardware form of computer system or apparatus. Consequently, in one alternate embodiment the present invention is realized in computer instructions for carrying out the disclosed method on a general purpose digital computer. In a further alternate embodiment of the present invention, a computer readable storage medium comprising the above-mentioned computer instructions is provided. In a still further alternate embodiment, a computer readable carrier wave comprising computer instructions for carrying out the disclosed method is provided.

Conclusion

The techniques described herein rapidly and adaptably remap packet header data so that the queuing and forwarding portion of the switch/router can efficiently delivery the packet-wise desired quality of service to ultra-high bandwidth, carrier-class flows.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

I claim:

1. A method of service provision in a communications system comprising:

parsing an incoming packet to generate an extracted plurality of fields;

extracting an autonomous system identifier from said extracted plurality of fields;

converting said autonomous system identifier into a label;

selecting a transform from a predetermined list wherein said list is indexed by said label;

extracting a type of service identifier from said extracted plurality of fields;

converting said type of service identifier according to said transform into an internal identifier; and employing said internal identifier in follow-on processing to provide a particular packet service.

2. The method of claim 1 wherein said converting said autonomous system identifier uses a static lookup table, and wherein said label has fewer bits than said autonomous system identifier.

3. The method of claim 1 wherein said converting said autonomous system identifier uses a dynamic lookup table, and wherein said label has fewer bits than said autonomous system identifier.

4. A computer system for service provision in a communications system comprising:

input circuitry receiving a plurality of input flows, said input flows each comprising a plurality of packets, said packets each containing a plurality of fields;

a plurality of output queues; and a controller coupled to said input circuitry and said plurality of output queues, wherein said controller:

parses an incoming packet to generate an extracted plurality of fields;

extracts an autonomous system identifier from said extracted plurality of fields;

converts said source autonomous system identifier into a label;

selects a transform from a predetermined list wherein said list is indexed by said label;

extracts a type of service identifier from said extracted plurality of fields;

converts said type of service identifier according to said transform into an internal identifier; and employs said internal identifier in follow-on processing to provide a particular packet service.

5. The computer system of claim 4 wherein said controller converts said autonomous system identifier into said label using a static lookup table, and wherein said label has fewer bits than said autonomous system identifier.

6. The computer system of claim 4 wherein said controller converts said autonomous system identifier into said label using a dynamic lookup table, and wherein said label has fewer bits than said autonomous system identifier.

7. A method of service provision in a communications system comprising:

parsing an incoming packet to generate an extracted plurality of fields;

transforming said extracted plurality of fields to form an internal identifier, wherein said transforming comprises extracting an autonomous system identifier from said extracted plurality of fields, converting said autonomous system identifier into a label, extracting a type of service identifier from said extracted plurality of fields, and combining said label and said type of service identifier into said internal identifier; and employing said internal identifier in follow-on processing to provide a particular packet service.

8. The method of claim 7 wherein said converting uses a static lookup table, and wherein said label has fewer bits than said autonomous system identifier.

9. The method of claim 7 wherein said converting uses a dynamic lookup table, and wherein said label has fewer bits than said autonomous system identifier.

10. A method of service provision in a communications system comprising:
   parsing an incoming packet to generate an extracted plurality of fields;
   transforming said extracted plurality of fields to form an internal identifier, wherein said transforming comprises
      extracting a source autonomous system identifier from said extracted plurality of fields,
      converting said source autonomous system identifier into a first label,
      extracting a type of service identifier from said extracted plurality of fields,
      extracting a destination autonomous system identifier from said extracted plurality of fields,
      converting said destination autonomous system identifier into a second label, and
      combining said first label, said type of service identifier, and said second label into said internal identifier; and
   employing said internal identifier in follow-on processing to provide a particular packet service.

11. The method of claim 10 wherein said converting uses a static lookup table, and wherein each of said first and said second labels has fewer bits than said source autonomous system identifier and said destination autonomous system identifier, respectively.

12. The method of claim 10 wherein said converting uses a dynamic lookup table, and wherein each of said first and said second labels has fewer bits than said source autonomous system identifier and said destination autonomous system identifier, respectively.

13. A computer system for communications comprising:
   input circuitry receiving a plurality of input flows, said input flows each comprising a plurality of packets, said packets each comprising a plurality of fields;
   a plurality of output queues; and
   a controller coupled to said input circuitry and said plurality of output queues, wherein said controller:
      parses an incoming packet to generate an extracted plurality of fields;
      transforms said extracted plurality of fields according to an algorithm wherein
         the result of said algorithm forms an internal identifier, wherein said controller
         extracts an autonomous system identifier from said extracted plurality of fields,
         converts said autonomous system identifier into a label,
         extracts a type of service identifier from said extracted plurality of fields, and
         combines said label and said type of service identifier into said internal identifier; and
      employs said internal identifier in follow-on processing;
   wherein said controller gives preferential treatment to at least one of said output queues.

14. The computer system of claim 13 wherein said controller converts said autonomous system identifier into said label using a static lookup table, and wherein said label has fewer bits than said autonomous system identifier.

15. The computer system of claim 13 wherein said controller converts said autonomous system identifier into said label using a dynamic lookup table, and wherein said label has fewer bits than said autonomous system identifier.

16. A computer system for communications comprising:
   input circuitry receiving a plurality of input flows, said input flows each comprising a plurality of packets, said packets each comprising a plurality of fields;
   a plurality of output queues; and
   a controller coupled to said input circuitry and said plurality of output queues, wherein said controller:
      parses an incoming packet to generate an extracted plurality of fields;
      transforms said extracted plurality of fields according to an algorithm wherein
         the result of said algorithm forms an internal identifier, wherein said controller
         extracts a source autonomous system identifier from said extracted plurality of fields,
         converts said source autonomous system identifier into a first label,
         extracts a type of service identifier from said extracted plurality of fields,
         extracts a destination autonomous system identifier from said extracted plurality of fields,
         converts said destination autonomous system identifier into a second label, and
         combines said first label, said type of service identifier, and said second label into said internal identifier;
   wherein said controller gives preferential treatment to at least one of said output queues.

17. The computer system of claim 16 wherein said controller converts said source autonomous system identifier and said destination autonomous system identifier using a static lookup table, wherein each of said first and said second labels has fewer bits than said source autonomous system identifier and said destination autonomous system identifier, respectively.

18. The computer system of claim 16 wherein said controller converts said source autonomous system identifier and said destination autonomous system identifier using a dynamic lookup table, wherein each of said first and said second labels has fewer bits than said source autonomous system identifier and said destination autonomous system identifier, respectively.

19. A computer system for internetworking, the system comprising a computer and a plurality of output queues interoperably connected to each other, wherein said computer further comprises computer instructions for:
   parsing an incoming packet to generate an extracted plurality of fields;
   transforming said extracted plurality of fields to form an internal identifier, wherein said transforming comprises
      extracting an autonomous system identifier from said extracted plurality of fields,
      converting said autonomous system identifier into a label,
      extracting a type of service identifier from said extracted plurality of fields, and
      combining said label and said type of service identifier into said internal identifier; and
   employing said internal identifier in follow-on processing to provide a particular packet service.

20. The computer system of claim 19 wherein said converting uses a static lookup table, and wherein said label has fewer bits than said autonomous system identifier.

21. The computer system of claim 19 wherein said converting uses a dynamic lookup table, and wherein said label has fewer bits than said autonomous system identifier.

22. A computer system for internetworking, the system comprising a computer and a plurality of output queues interoperably connected to each other, wherein said computer further comprises computer instructions for:
  parsing an incoming packet to generate an extracted plurality of fields;
  transforming said extracted plurality of fields to form an internal identifier, wherein said transforming comprises
    extracting a source autonomous system identifier from said extracted plurality of fields,
    converting said source autonomous system identifier into a first label,
    extracting a type of service identifier from said extracted plurality of fields,
    extracting a destination autonomous system identifier from said extracted plurality of fields,
    converting said destination autonomous system identifier into a second label, and
    combining said first label, said type of service identifier, and said second label into said internal identifier; and
  employing said internal identifier in follow-on processing to provide a particular packet service.

23. The computer system of claim 22 wherein said converting uses a static lookup table, and wherein each of said first and said second labels has fewer bits than said source autonomous system identifier and said destination autonomous system identifier, respectively.

24. The computer system of claim 22 wherein said converting uses a dynamic lookup table, and wherein each of said first and said second labels has fewer bits than said source autonomous system identifier and said destination autonomous system identifier, respectively.

25. A computer readable storage medium comprising computer instructions for:
  parsing an incoming packet to generate an extracted plurality of fields;
  transforming said extracted plurality of fields to form an internal identifier, wherein said transforming comprises
    extracting an autonomous system identifier from said extracted plurality of fields,
    converting said autonomous system identifier into a label,
    extracting a type of service identifier from said extracted plurality of fields, and
    combining said label and said type of service identifier into said internal identifier; and
  employing said internal identifier in follow-on processing to provide a particular packet service.

26. The computer readable storage medium of claim 25 wherein said converting uses a static lookup table, and wherein said label has fewer bits than said autonomous system identifier.

27. The computer readable storage medium of claim 25 wherein said converting uses a dynamic lookup table, and wherein said label has fewer bits than said autonomous system identifier.

28. A computer readable storage medium comprising computer instructions for:
  parsing an incoming packet to generate an extracted plurality of fields;
  transforming said extracted plurality of fields to form an internal identifier, wherein said transforming comprises
    extracting a source autonomous system identifier from said extracted plurality of fields,
    converting said source autonomous system identifier into a first label,
    extracting a type of service identifier from said extracted plurality-of fields,
    extracting a destination autonomous system identifier from said extracted plurality of fields,
    converting said destination autonomous system identifier into a second label; and
    combining said first label, said type of service identifier, and said second label into said internal identifier, and
  employing said internal identifier in follow-on processing to provide a particular packet service.

29. The computer readable storage medium of claim 28 wherein said converting uses a static lookup table, and wherein each of said first and said second labels has fewer bits than said source autonomous system identifier and said destination autonomous system identifier, respectively.

30. The computer readable storage medium of claim 28 wherein said converting uses a dynamic lookup table, and wherein each of said first and said second labels has fewer bits than said source autonomous system identifier and said destination autonomous system identifier, respectively.

31. A computer readable carrier wave comprising computer instructions for:
  parsing an incoming packet to generate an extracted plurality of fields;
  transforming said extracted plurality of fields to form an internal identifier, wherein said transforming comprises
    extracting an autonomous system identifier from said extracted plurality of fields,
    converting said autonomous system identifier into a label,
    extracting a type of service identifier from said extracted plurality of fields, and
    combining said label and said type of service identifier into said internal identifier; and
  employing said internal identifier in follow-on processing to provide a particular packet service.

32. The computer readable carrier wave of claim 31 wherein said converting uses a static lookup table, and wherein said label has fewer bits than said autonomous system identifier.

33. The computer readable carrier wave of claim 31 wherein said converting uses a dynamic lookup table, and wherein said label has fewer bits than said autonomous system identifier.

34. A computer readable carrier wave comprising computer instructions for:
  parsing an incoming packet to generate an extracted plurality of fields;
  transforming said extracted plurality of fields to form an internal identifier, wherein said transforming comprises
    extracting a source autonomous system identifier from said extracted plurality of fields,
    converting said source autonomous system identifier into a first label,
    extracting a type of service identifier from said extracted plurality of fields,
    extracting a destination autonomous system identifier from said extracted plurality of fields,
    converting said destination autonomous system identifier into a second label, and
    combining said first label, said type of service identifier, and said second label into said internal identifier; and employing said internal identifier in follow-on processing to provide a particular packet service.

35. The computer readable carrier wave of claim 34 wherein said converting uses a static lookup table, and wherein each of said first and said second labels has fewer bits than said source autonomous system identifier and said destination autonomous system identifier, respectively.

36. The computer readable carrier wave of claim 34 wherein said converting uses a dynamic lookup table, and wherein each of said first and said second labels has fewer bits than said source autonomous system identifier and said destination autonomous system identifier, respectively.

* * * * *